Patented July 22, 1930

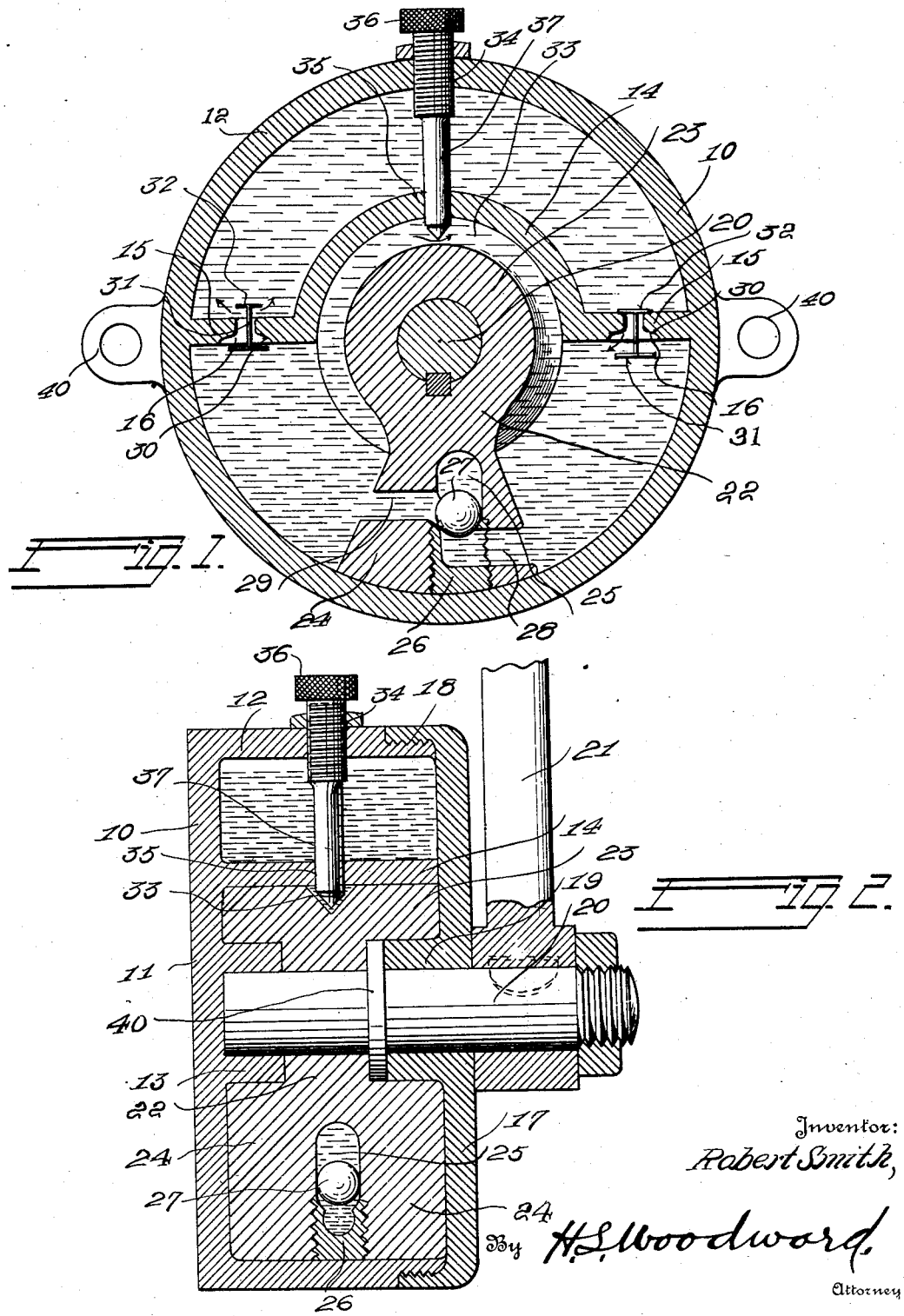

1,771,001

UNITED STATES PATENT OFFICE

ROBERT SMITH, OF LAKEWOOD, OHIO

SHOCK ABSORBER FOR MOTOR VEHICLES

Application filed August 6, 1928. Serial No. 297,789.

The invention has for an object to provide a novel structure in shock absorber devices, especially those in which an oscillating arm moves as a piston in a sector shaped chamber, although certain features of the invention may be found applicable in various other forms. A specific purpose is a novel coordination of elements with the effect of permitting free movement of the piston initially over a limited distance, this function being attained automatically under any load without special adjustment.

It is an important aim of the invention to present a shock absorber of this kind which will have great durability and rugged strength, especially by reason of the form of bearing for the piston member and the manner of its lubrication. A further important purpose of the invention is to present a novel utilization of space in a circular casing so as to provide a piston chamber and an auxiliary reservoir for a liquid operative as the retarding medium in the piston chamber. An object is to provide a novel construction of regulator means adapted to serve as a combined adjustment for the retarding action and as a filling opening closure.

A still further aim is to give a novel construction in the piston for movement of liquid freely therethrough in one direction and preventing movement of the liquid therethrough in the opposite direction, involving a coordination of a centrifugally operable and gravity operated ball check.

Additional objects, advantages and features of invention reside in the construction, arrangement and combination of parts involved in the embodiment of the invention as may be more readily understood from the following description and accompanying drawings, wherein, Figure 1 is a cross sectional view of the device at right angles to the axis of the piston.

Figure 2 is a sectional view at right angles to Figure 1 on the axis of the piston.

There is illustrated a shock absorber comprising a circular casing 10 having a planiform back wall 11 and a circumscribing, continuous cylindrical wall 12. On the inner side of the wall 11 there is formed an integral annular bearing and bushing 13, while in concentric spaced relation to this, and also formed integrally on the inner side of the wall 11 there is a semi-circular partition and piston bearing 14 continued from the ends of which there are integral radial partitions 15 both located in the same diametrical plane of the case 10, and each having similar ports 16 formed therethrough. The partition 14 is adjacent the upper side of the device, the space thereover being used as a reservoir, as will appear. The case is closed by a cover plate 17, which in the present instance is secured upon the case 10 by the formation of external threads upon the case, and internal threads upon a circumscribing flange 18 of the cover, so that the cover and case may be screwed together. The cover is also formed with a concentric bearing and bushing 19 similar to and projecting inwardly in opposition to the bearing 13 before described. Mounted in the bearings there is a shaft 20 which projects outwardly through the cover and at its outer end has secured thereon a lever or arm 21. A piston 22 is also suitably secured upon the shaft 20 within the case; the piston in the present instance having an enlarged circular knuckle portion 23 fitting snugly against the bearing partition 14, and suitably recessed on each side to receive the bearings 13 and 19 snugly therein as studs by which it is partly supported. A piston proper 24 is extended integrally from the knuckle, the outer end nearly or quite in sliding abutment with the inner face of the wall 12, and suitably shaped to move in close relation to the radial partition portion 15, as shown. A radial passage 25 is formed in the piston closed at the outer end by a seat fitting 26 screwed into the piston and having a passage extending therethrough opening on one side and the inner end. A ball 27, adapted to move loosely in the passage 25 and seat against the ends of the plug 26, is provided. A lateral passage 28 is formed in the piston communicating with the outer part of the passage in the plug 26 and opening on one of the radial faces of the piston closely adjacent the wall 12 of the case. On the opposite side of the piston a similar passage 29 leads from the passage 25 through the respective radial face of the piston. Around the ports 16 of the partitions 15 at the side adjacent the piston chamber, suitable seats 30 are formed upon which may engage respective check valves 31 located below the partitions 15 and having stems extended slidably upward through the ports 16 and provided with cross pieces 32 by which the opening movement of the valves is limited; and by which they are also supported in open position which they tend to assume by action of gravity.

The circular knuckle part 23 of the piston is formed with a peripheral groove 33 midway between the wall 11 and cover 17. In the wall midway of the reservoir at the upper side there is formed a large interiorly threaded opening 34, while on the same axis therewith a small smoothly finished opening 35 is formed through the bearing partition 14. A combined closure plug 36 and needle valve 37 is provided, having a large exteriorly threaded outer part adapted to screw snugly into the opening 34, and a reduced smoothly finished inner part or needle valve 37 fitted snugly and slidably in the opening 35, the inner extremity of the part 37 being shaped to conform closely to the shape of the groove 33 so as to nearly close the groove against movement of liquid when projected fully into the groove. The larger threaded portion of the plug 26 extends a considerable distance within the wall 12 when the extremity of the reduced part 37 is projected to its maximum distance toward the piston, so that it may be unscrewed a considerable distance without opening the casing.

The casing 10 may be formed with flanges 40 for its attachment to a motor vehicle frame, and the arm 21 may be constructed in any familiar way for connection to an axle. In the normal medial position of the parts, the piston 24 is located midway between the partitions 15 at the lower side while the arm 21 extends in such direction that when moved upwardly the piston will be moved to the right as viewed in Figure 1.

In use, the device is completely filled with a suitable liquid, petroleum lubricating oil customarily being employed, this being introduced through the opening 34 and the parts moved so as to fill the passages 25, 27, 29. The device being mounted on the vehicle, when the springs between the body and axle yield, the arm 21 moves upwardly and the piston 24 moves clockwise, movement of the oil thereby closing the forward valve 16, but the ball 27 being lifted so that the oil may move freely toward the rear through the piston so that a minimum resistance will be offered. Upon recoil of the spring the piston portion 24 moves counter-clockwise, the rear valve 31 being thereby closed and the pressure of the oil against the ball 27 causing it to seat firmly and oppose passage of the oil through the piston. The oil is thereby compressed between the piston and the partition 15 so as to oppose the return movement of the piston and likewise, the recoil action of the spring. However, the groove 33 provides a passage from the rear side of the piston 24 to the forward side thereof, and through this groove a certain amount of oil passes to relieve the pressure at the rear side of the piston, the rapidity of movement of oil through the groove being determined by the extent to which the needle valve 37 projects into the groove. The valves 31 and 32 automatically keep the piston chamber full of oil without liability of any bubbles.

There is a further peculiar function resulting from the action of the valves 31 consisting in the fact that on an initial movement of the piston 24 the oil in the piston chamber in advance of the piston will be forced through the port 16 in some amount before the valve 31 moves to closed position. At the same time the opposite valve 31 will be open, permitting oil to move freely through the reservoir chamber to the piston chamber again and in this way the initial movements of the piston will be free from impedance. This is true of oscillations in either direction. In consequence, the springs of the vehicle are free to act with their full resilience for a limited distance in both directions, first yielding to movements caused by slight irregularities in the roadway and then returning to initial position with equal freedom. However, after the valve 31 in advance of any movement of the piston has been closed, further action of the device will then depend on the direction in which the piston is moving. As before stated, the movement of the piston on compression of the spring is relatively free from opposition, but on the recoil of the spring the movement is retarded in a degre corresponding to the adjustment of the needle valve 37. It will be appreciated that friction and impact of oil against the valve 31, its stem and its cross piece 32 will be the moving agencies for closing these valves, and consequently slow movements of the piston of any extent will not close the valves, and that rapid movement will not close either valve until a certain initial free and unobstructed movement of the piston has occurred.

The shaft 20 is formed with an integral peripheral flange 40 which fits snugly against the inner end of the bearing 19 so as to prevent the shaft from pulling out from the casing. This relieves the piston of such stresses.

I claim:

A shock absorber comprising a body having a piston chamber, a piston therein, a liquid reservoir above the chamber having communication with the ends of the chamber, respective check valves at the ends of the chamber controlling the flow from the chamber at said communications, and constructed for an initial non-impeding movement in closing of a substantial extent whereby initial movements of the piston in either direction will be unimpeded by reason of liquid passing said communications during closing movements of the valves, and operative connections between the body and piston on one hand and a spring-supporting member and a spring supported member on the other, the piston having a concentric upper part grooved to form communication between opposite ends of the chamber, a large threaded opening formed through the upper side of the reservoir, and a smaller opening alined with the first and extending between the reservoir and chamber, a plug screwed into the larger opening as a closure, and a needle valve carried thereby and engaged through the smaller opening and adapted to be adjusted in said grooves by operation of the plug.

In testimony whereof I affix my signature.

ROBERT SMITH.